United States Patent [19]

Johnson et al.

[11] Patent Number: 5,503,357

[45] Date of Patent: Apr. 2, 1996

[54] LOCK MECHANISM FOR TRIPOD LEGS

[75] Inventors: Joel W. Johnson; Chadwell O'Connor, both of Newport Beach, Calif.

[73] Assignee: Q-Co Industries, Inc., New York, N.Y.

[21] Appl. No.: 337,147

[22] Filed: Nov. 10, 1994

Related U.S. Application Data

[63] Continuation of Ser. No. 46,157, Apr. 13, 1993, abandoned.

[51] Int. Cl.⁶ .................................................. F16M 11/26
[52] U.S. Cl. ........................................ 248/188.5; 248/169
[58] Field of Search ............................... 248/188.5, 161, 248/168, 170, 188.8; 403/109, 236, 321

[56] References Cited

U.S. PATENT DOCUMENTS

| | | | |
|---|---|---|---|
| 1,244,682 | 10/1917 | Akeley | 248/188.5 X |
| 1,394,691 | 10/1921 | Spence, Jr. . | |
| 1,426,088 | 8/1922 | Mitchell . | |
| 1,495,458 | 5/1924 | Thalhammer . | |
| 2,206,069 | 7/1940 | Adams . | |
| 2,211,314 | 8/1940 | Beggs . | |
| 2,854,204 | 9/1958 | Growall . | |
| 4,455,005 | 6/1984 | Mooney . | |
| 4,522,361 | 6/1985 | Mooney . | |
| 5,320,316 | 6/1994 | Baker | 248/188.5 X |

FOREIGN PATENT DOCUMENTS

| | | | |
|---|---|---|---|
| 946527 | 7/1956 | Germany | 248/188.5 |
| 531439 | 8/1955 | Italy . | |

OTHER PUBLICATIONS

Two pages of a brochure from O'Connor Engineering Laboratories on their Model 55–C Metal Tripod.
One–page engineering drawing illustrating different views of the Model 55–C Metal Tripod, including a cross–sectional view of its locking mechanism.

*Primary Examiner*—Blair M. Johnson
*Attorney, Agent, or Firm*—Leydig, Voit & Mayer, Ltd.

[57] ABSTRACT

A tripod is provided having three pairs of adjacent telescoping legs and a lock mechanism for locking the adjacent legs in a desired position. The lock mechanism comprises a lever connecting a pair of lock assemblies associated with each adjacent leg for movement between an unlocked position wherein the legs may be telescopingly adjusted and a locked position wherein the lock assembly exerts a clamping force on its respective leg for locking the leg in a desired position. Each lock assembly comprises a clamp member for receiving a telescoping leg and a threaded hole adapted to receive a threaded end of a lock screw. A lock screw clamp attached to the head end of the lock screw controls the rotation of the lock screw into and out of the hole. To insure that the legs are properly locked, the attached lock screw clamp and lock screw are pivotable between a locked position wherein the lock screw exerts a compression or clamping force on the legs to prevent telescoping movement of the legs and to lock the legs in the desired position and an unlocked position wherein the lock screw permits sliding movement between the legs. The clamp member has top and bottom stops which limit the rotation of the lock screw clamp between the locked and unlocked positions.

18 Claims, 2 Drawing Sheets

LOCK MECHANISM FOR TRIPOD LEGS

This is a continuation of U.S. application Ser. No. 08/046,157 filed on Apr. 13, 1993, now abandoned.

FIELD OF THE INVENTION

The present invention relates generally to tripods for supporting equipment and, more particularly to an adjustable tripod leg having a lock mechanism for locking the leg in a desired position.

BACKGROUND OF THE INVENTION

Tripods with adjustable legs are typically used for supporting equipment such as cameras, surveying instruments and the like. Typically, the tripod will have three adjustable supports, each support having a pair of legs which diverge upwardly from the foot to the mounting plate for the equipment. Each leg has a fixed leg member attached to the plate and a sliding leg member telescopingly attached to the fixed leg member.

The typical mechanisms for locking the adjusting legs at a desired length have presented an assortment of disadvantages. For example, many of the previous mechanisms used knobs, screws or twisting devices which can strip, jam, or in cold weather, freeze the lock during use. Even when properly operating, these mechanisms are generally slow and cumbersome to lock, requiring two separate actions and multiple rotations of the knob to properly lock. Such characteristics are particularly disadvantageous when a quick set-up is required for heavy loads such as portable news cameras in the field. The previous mechanisms have also required considerable manual force to be properly locked. In addition, it was difficult to determine when the locking mechanism is properly locked. If the knob mechanism is rotated too much, the screw may damage the leg members whereas, if the knob mechanism is rotated an insufficient amount, the screw may not lock the leg and the expensive and heavy equipment might fall and be damaged.

OBJECTS AND SUMMARY OF THE INVENTION

One object of the present invention is to provide an adjustable tripod leg having a lock mechanism which is capable of locking or unlocking the legs regardless of their vertical height or the distance between them.

It is also an object of the present invention to provide a locking mechanism which has defined locked and unlocked positions to insure that the legs are properly locked.

A further object is to provide an adjustable tripod leg having a lock mechanism which is sturdy enough to withstand heavy loads and yet which may still be easily and simply unlocked and locked for quick set up and adjustment.

Another aspect of the present invention is to provide a locking mechanism for a tripod leg which works reliably under all conditions, and which will continue to work reliably over a long lifetime of use, even as components wear.

It is a similar object of the present invention to provide a lock mechanism which may be easily adjustable, even in the field, to maintain the locking force despite wear on any of the components.

Still another object of the present invention is to provide a locking mechanism which may be operated with minimal effort.

A further object of the present invention is to provide an adjustable tripod and lock mechanism in which the components are protected from damage during handling.

The present invention is generally directed to a tripod having three pairs of adjacent legs wherein each leg has telescoping fixed and sliding leg members. The tripod also has a novel and unique lock mechanism which permits quick and easy adjustment of adjacent legs to selected lengths. The lock mechanism comprises a lever connecting a pair of lock assemblies associated with each adjacent leg for movement between an unlocked position wherein the leg members may be telescopingly adjusted and a locked position wherein the lock assembly exerts a clamping force on its respective leg for locking the leg in a desired position. The lever provides simultaneous operation of two adjacent lock assemblies.

Each lock assembly comprises a clamp member having a through bore for receiving the fixed and sliding leg members and a threaded hole adapted to receive a threaded end of a lock screw. A lock screw clamp attached to the head end of the lock screw controls the rotation of the lock screw into and out of the hole. Rotation of the lock screw into the hole creates a compression or clamping force on the leg members so as to lock the leg members in the desired position and prevent sliding movement between the leg members whereas rotation of the lock screw out of the hole releases the clamping force and permits the leg members to be selectively adjusted.

To insure that the leg members are properly locked, the attached lock screw clamp and lock screw are pivotable between a locked position wherein the lock screw exerts a sufficient clamping force on the fixed and sliding leg members to lock the leg members in the desired position and an unlocked position wherein the lock screw permits sliding movement between the leg members. To limit the rotation of the lock screw clamp between the locked and unlocked positions, the clamp member has top and bottom faces or stops. The lock screw clamp has an ear which engages the top stop in the unlocked position and the bottom stop in the locked position in response to the rotation of the lock screw clamp. The lever may be attached to the lock screw clamps disposed on adjacent legs so as to permit both lock assemblies to be simultaneously locked and unlocked.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention as defined by the appended claims.

DETAILED DESCRIPTION OF THE PREFERRED EMBODIMENT

Figure 1:
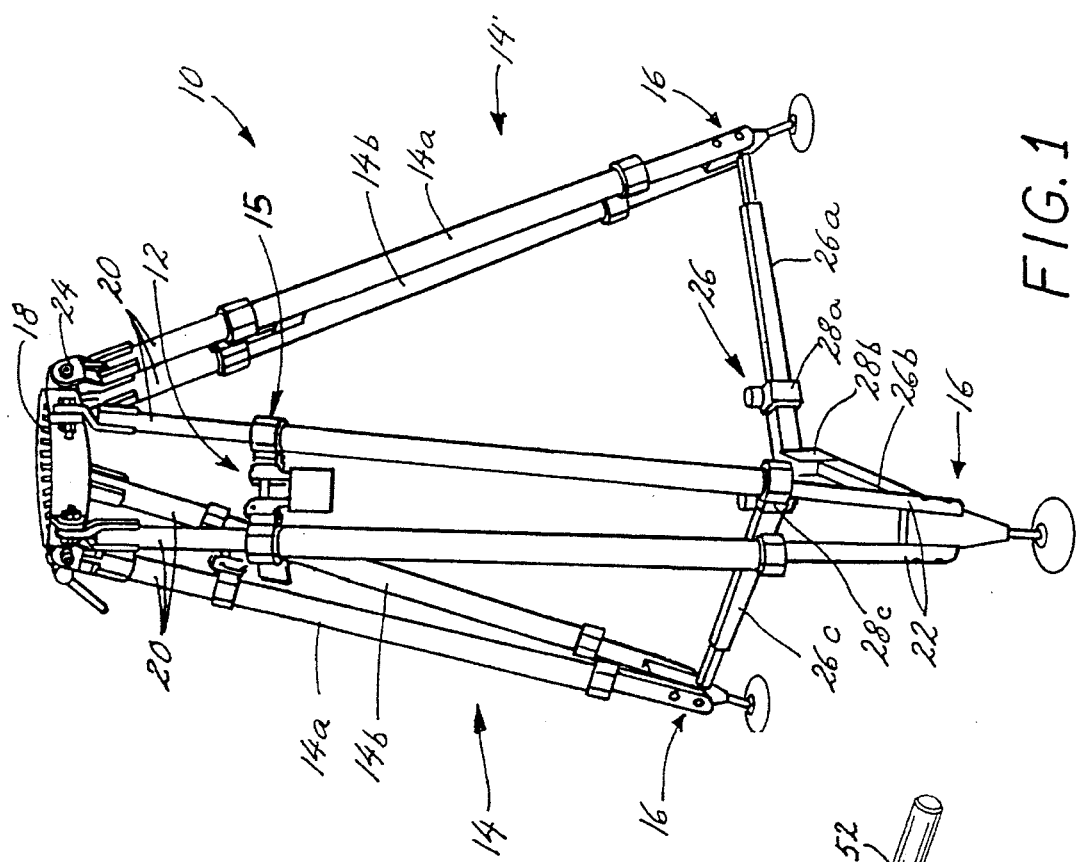
FIG. 1 is a perspective view of a tripod and one embodiment of a lock mechanism made in accordance with the present invention.

Turning to the figures, FIG. 1 illustrates a perspective view of a tripod 10 and a lock mechanism 12 made in accordance with the invention. The tripod 10 has three supports 14, each support 14 having a pair of legs 14a, 14b which diverge upwardly from a foot assembly 16 to a mounting plate assembly 18. Each leg 14a, 14b has a fixed upper leg member 20 and a sliding lower leg member 22. The upper end of the fixed leg member 20 is typically pivotably attached in a suitable manner, such as a pin, a bolt 24 or the like, to the tripod mounting plate 18. The type of tripod plate 18 used may differ depending on the intended use. The tripod plate 18 shown in FIG. 1 is capable of fixing a camera head and subsequently a portable television or film camera (not shown).

The lower end of the sliding leg member 22 is connected to the foot assembly 16. The tripod 10 may also include a spreader 26 as illustrated in FIG. 1 or a dolly (not shown) which includes a wheel or caster on which the entire apparatus may be rolled, as is conventional in the art. The tripod 10 can of course be used without the spreader 26. However, in certain uses, particularly on hard, smooth surfaces, the spreader 26 is desirable since it can hold the supports 14 together so as to prevent them from sliding apart, and, further, can be used to support the entire tripod 10 for movement across the surface. The typical spreader 26 includes three spreader legs 26a, 26b, 26c. The spreader legs 26a, 26b, 26c permit telescoping adjustment of their lengths, each spreader leg 26a, 26b, 26c having a lock mechanism 28a, 28b, 28c.

Figure 3:
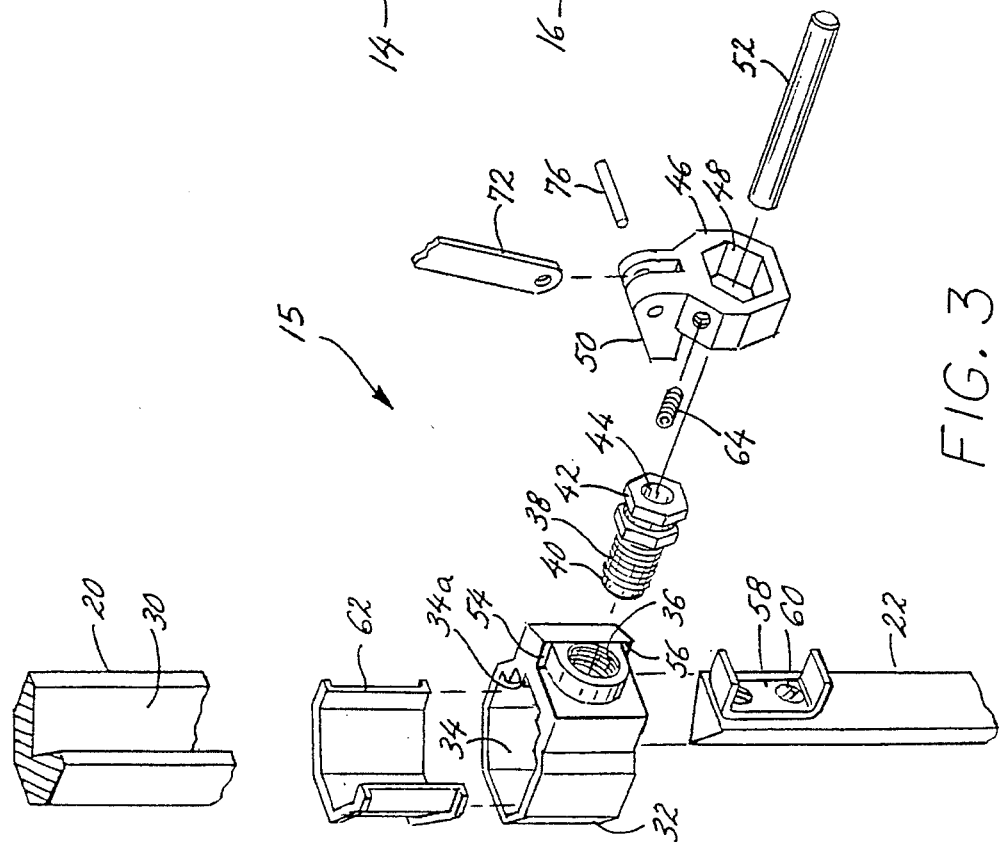
FIG. 3 is an exploded view of the lock assembly associated with each leg.

As is known in the art, the fixed and sliding leg members 20, 22 are adapted to slide relative to each other and are arranged in an overlapping arrangement so that the leg members 20, 22 can be telescopingly adjusted to various lengths and so that the leg members 20, 22 can be extended or retracted when desired. Typically, the fixed leg member 20 has a channel or groove 30 adapted to slidably receive and guide the sliding leg member 22. Although the groove 30 shown in FIG. 3 is substantially V-shaped, it may have a shape which is adapted to slidably receive the sliding leg member 22. Accordingly, the two leg members 20, 22 may be adjusted axially with respect to one another in an essentially telescoping fashion so as to permit adjustment of the overall length of the support 14.

In accordance with one of the objects of the invention, a lock mechanism 12 is provided which fixes the two adjacent legs 14a, 14b together in a desired position. The lock mechanism 12 comprises a lock assembly 15 associated with each leg 14a, 14b for locking the respective leg 14a, 14b in a desired position and a lever assembly 69 connecting the adjacent lock assemblies 15 to simultaneously lock or unlock the adjacent legs 14a, 14b in the desired position.

As shown in FIG. 3, which illustrates an exploded view of one of the lock assemblies 15 associated with each leg 14, each lock assembly 15 comprises a clamp member 32 having a through bore 34 and a screw hole 36, a lock screw 38 having threaded and head ends 40, 42 and an axial bore 44, and a lock screw clamp 46 having a bore 48 and ear 50.

Referring to FIG. 3, it will be seen that the clamp member 32 has top and bottom stops 54, 56 and that the centrally disposed through bore 34 is adapted to receive the fixed and sliding leg members 20, 22 for guiding the leg members 20, 22 in a generally telescoping manner and for locking or clamping the leg members 20, 22 together in a desired position. The through bore 34 is adapted to generally extend around the outer circumference of the leg members 20, 22 and to engage and conform to the outer contours of the leg members 20, 22.

A channel-shaped inner leg bracket 58 disposed at the upper end of the sliding leg member 22 cooperates with a seat 34a disposed within the bore 34 of the clamp member 32 so as to releasably position the clamp member 32 at the upper end of the sliding leg member 22. The bracket 58 may be attached to the sliding leg member 22 in any suitable manner including, for example, by the use of screws 60. In the embodiment shown, the lock assemblies 15 are coupled to the sliding lower leg members 22, and, therefore, slide relative to the mounting plate 18 and fixed upper leg member 20. It will be appreciated that the lock assemblies could alternately be coupled to the fixed upper leg member 20 such that they would move relative to the lower sliding leg member 22.

In order to lock the leg members 20, 22 in a desired position, the threaded hole 36 of the clamp member 32 is adapted to receive the threaded end 40 of the lock screw 38. Rotation of the lock screw 38 in one direction moves the lock screw 38 into the hole 36 while rotation of the lock screw 38 in the other direction moves the lock screw 38 out of the hole 36. Since the axis of the threaded hole 36 is generally perpendicular to the axis of the through bore 34 and the longitudinal axis of the leg members 20, 22, rotation of the threaded end 40 of the lock screw 38 into the bore 36 creates a transverse compression or clamping force on the leg members 20, 22. The compression force exerted by the lock screw 38 forces the sliding leg member 22 into clamping engagement with the fixed leg member 20. Similarly, the fixed and sliding leg members 20, 22 are forced into clamping engagement with the clamp member 32. It should now be appreciated that the frictional and compression forces exerted between the clamp member 32 and the leg members 20, 22 will prevent the leg members 20, 22 from sliding relative to each other. Conversely, in order to adjust the length of the leg members 20, 22, the lock screw 38 is rotated in the other direction which releases the clamping force and permits telescoping adjustment of the leg members 20, 22.

It is preferable that a leg shoe 62 be disposed between the fixed leg member 20 and the bore 34 to minimize wear and friction. It will be also appreciated that excessive rotation of lock screw 38 forces the threaded end 40 to "drill" into the sides of the sliding leg member 22. In order to minimize such damage to the leg member 22, the positioning bracket 58 also acts as a metal reinforcing member which distributes the transverse force of the lock screw 38 along the sliding leg member 22.

In accordance with one of the objects of the invention, the rotation of the lock screw 38 is controlled for movement between locked and unlocked positions to insure that the lock screw 38 is properly positioned into locking and clamping engagement with the leg members 20, 22. In the locked position, the lock screw 38 is rotated into the hole 36 so as to clamp the leg members 20, 22 together and maintain the desired position of the leg members 20, 22. In the unlocked position, the lock screw 38 is rotated so as to release the compressive forces on the leg members 20, 22 and permit telescoping adjustment of the leg members 20, 22.

The rotation of the lock screw 38 is controlled by the lock screw clamp 46. The lock screw clamp 46 has an outwardly projecting ear 50 and a bore 48 which is adapted to receive the head end 42 of the lock screw 38 disposed opposite the threaded end 46. The hexagonal bore 48 is adapted to slidably and adjustably receive the head end 42 in the axial direction of the lock screw 38 while preventing rotation therebetween. Thus, it will be appreciated that the rotation of the lock screw clamp 46 causes rotation of the lock screw 38. Although the head end 42 has a hexagonal shape adapted to cooperatively engage the similarly shaped hexagonal bore 48 in the lock screw clamp 46 in the illustrated embodiment, it will be appreciated that the bore 48 and the cooperating lock screw head 42 can be of any complementary shape such as triangular, rectangular or the like so long as the lock screw clamp 46 may rotate the lock screw 38. It is also desirable that the lock screw clamp 46 have a set screw 64 to prevent the lock screw 38 from inadvertently sliding out of the lock screw clamp 46.

In order to control the rotation of the attached lock screw clamp 46 and the lock screw 38 between the locked and unlocked positions, the ear 50 projecting outwardly from the lock screw clamp 46 is adapted to rotate between and to engage the top and bottom stops 54, 56 of the clamp member 32 in response to the rotation of the lock screw clamp 46. The stops 54, 56 define the limits of rotation of the lock screw clamp 46 and the lock screw 38. In the illustrated embodiment, the lock screw clamp 46 and the lock screw 38 are in the unlocked position, which permits adjustment of the leg members 20, 22, when the ear 50 engages the top stop 54. The lock screw clamp 46 and the lock screw 38 are in the locked position, which prevents movement of the leg members 20, 22, when the ear 50 engages the bottom stop 56. In the illustrated embodiment, the top and bottom faces 54, 56 are disposed about 180° apart so that they are opposite each other, but they may be disposed anywhere along the circumference of the hole 36 so as to limit the rotation of the clamp 46 and, concomitantly, the lock screw 38.

It should now be appreciated that the lock mechanism 12 controls the rotation of the lock screw 38 between locked and unlocked positions. The lock mechanism 12 defines easily recognizable locked and unlocked positions to insure that the tripod 10 is not damaged by the improper over-rotation or under-rotation of the lock screw 38.

The lock screw 38 may be adjusted when assembled to provide the proper or pre-set clamping force and may be further adjusted throughout the useful life of the tripod 10 to maintain the force despite wear on any of the components. In order to position the lock screw clamp 46 in the locked position, i.e. wherein the ear 50 engages the bottom stop 56 of the clamp member 32, the lock screw 38 is rotated into the hole 36 so that a preset, desired compressive force is exerted on the leg members 20, 22 and the leg members 20, 22 are properly locked together. The lock screw clamp 46 is then attached to the lock screw 38 by attaching the hexagonal bore 48 and the cooperating hexagonal head end 44 with the set screw 64. The leg members 20, 22 may then be adjusted by pivoting the lock screw clamp 46 from the bottom, locked position shown in FIG. 1 and also in phantom in FIG. 2 to the top, unlocked position shown in FIG. 2. To maintain the locking force despite wear in the lock mechanism 12, the attached lock screw 38 and clamp 46 may be periodically adjusted so that they exert the maximum or pre-set clamping force on the leg members 20, 22 when the ear 50 engages the bottom stop 56 of the clamp member 32. It will be appreciated that, in the illustrated embodiment, the hexagonal shape permits lock screw 38 and clamp 46 to be adjusted every 60 degrees.

It will be appreciated that distance between two adjacent lock assemblies 15 disposed on adjacent legs 14a, 14b will vary as the length of the support 14 changes. In practice, the lock assemblies 15 associated with each leg 14a, 14b are spaced a minimum distance apart when the legs 14a, 14b are in their completely extended position and spaced a maximum distance apart in their most retracted position. The variations in the distance between the lock assemblies 15 is due to the upward divergence of the legs 14a, 14b. To maintain the relative vertical position of the adjacent lock assemblies 15, the lock mechanism 12 further comprises a dowel pin 52 for connecting the bores 44 of the lock screws 38 in the adjacent lock assemblies 16. The pin 52 freely and slidably engages the respective bores 44 to maintain the lock screws 38 concentric relative to each other and, thus, insures that the adjacent lock assemblies 16 are aligned and slide vertically in unison with each other.

Figure 2:
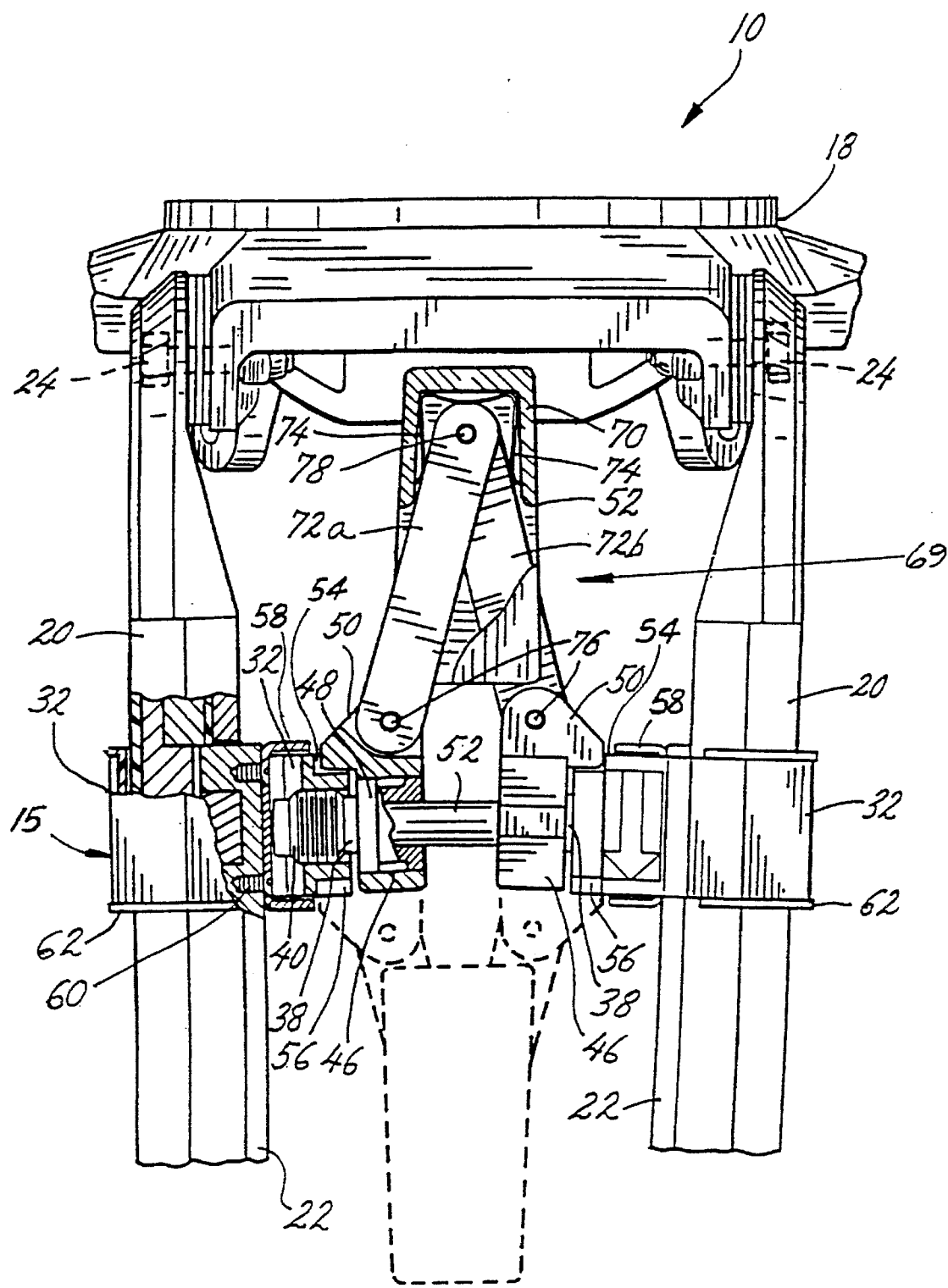
FIG. 2 is a partial cross-sectional view of the tripod and the lock mechanism in the unlocked position and the locked position in phantom.

According to an important aspect of the invention, clamping and unclamping of the leg members 20, 22 results from the movement of a lever 69, which ultimately controls the rotation of the lock screw 38 through a series of mechanical elements and interlocks. In order to permit the operator to adjust two adjacent lock assemblies 15 and permit adjacent legs 14a, 14b to be completely clamped or released by a single action, the lever 69 is operatively attached to adjacent lock assemblies 15 for movement between the locked and unlocked positions. Referring to FIG. 2, the lever 69 comprises a housing 70 for two links 72a, 72b and a spring 74. Specifically, the lever 69 is attached to the adjacent lock assemblies 15 by the links 72a, 72b which are pivotably attached to the respective ears 50 by respective pins 76. In the lever's unlocked position shown in FIG. 2, the lock screw clamp 46 is in the unlocked position which, as previously explained, permits telescoping adjustment of the leg 14. Downward rotation of the lever 69 to the locked position, shown in phantom in FIG. 2, causes the lock screw clamp 46 to pivot to the locked position wherein the fixed and sliding leg members 20, 22 are locked in position. In addition to permitting the operator to operate two lock assemblies 15 simultaneously, it will be appreciated that the lever 69 maximizes the rotational torque exerted on the lock screw clamp 46 and the lock screw 38 to provide an easily operated lock mechanism 12. Referring to FIGS. 1 and 2, it will also be seen that the lock mechanism is disposed between the adjacent legs 14a, 14b and is thus protected from damage during handling.

It will also be appreciated that the threaded ends 40 on the adjacent lock screws 38 are formed oppositely so that rotation of the lever 69 and the lock screw clamps 46 in the same direction will cause the same action to take place in each of the lock assemblies 15 associated with each leg 14a, 14b. In other words, the threaded end 40 on the lock screw 38 associated with leg 14a is left handed while the threaded end 40 associated with the other leg 14b is right handed.

In order to accommodate the varying distance between the two adjacent legs 14a, 14b, one end of each link 72a, 72b is pivotably connected by pin 76 to its respective lock screw clamp 46. The other end of the link 72a is pivotably connected to link 72b by pin 78. The links 72a, 72b will pivot relative to their respective lock screw clamps 46 and to each other in order to accommodate the distance between the lock assemblies 15 as the length of the adjacent legs 14a, 14b are adjusted. The spring 74 maintains secure engagement between the housing 70 and the links 72a, 72b as the links 72a, 72b move in response to the movement of the respective lock assemblies 15.

In order to operate the tripod 10 and the lock mechanism 12, the tripod 10 with the legs 14a, 14b fully retracted is typically carried on the operator's shoulder. The lock mechanism 12 is in the locked position to hold the legs 14a, 14b in the retracted position. To set up quickly, the operator can swing the tripod 10 down while pivoting the lever 69 to the unlocked position so as to release both of the lower sliding leg members 22 and adjust the length of the first support 14. When the desired length is achieved, the operator pivots the lever 69 to the locked position to lock the legs 14a, 14b in the desired position. The legs 14 of the other two supports are similarly adjusted to the desired length. The operator then spreads the three tripod supports to the open position. The operator need not be concerned with whether or not the tripod legs 14 are securely locked because a quick visual inspection of the legs 14 will reveal whether the assemblies 15 are, in fact, locked. The lock assemblies 15 will insure a solid clamping of the legs 14 against sliding movement when they are in the locked position.

To collapse the tripod 10, the three tripod supports are retracted to their generally closed parallel position. In the first support, the lever 69 is pivoted to the unlocked position so that the legs may be retracted to their compact, closed position. The lever 69 is then pivoted to the locked position to maintain the legs 14 in the desired position. The legs 14 of the other two supports are similarly retracted.

The lock mechanism 12 described above thus enables a tripod leg to be quickly and easily adjusted to virtually any desired length. The lock mechanism 12 has positive locked and unlocked positions which simplify the operation and provide extremely sturdy clamping, enabling the tripod 10 to be used with relatively high loads.

We claim as our invention:

1. A lock assembly for a support for a tripod, the support having first and second legs, each leg having first and second telescoping leg members, the lock assembly providing a visual indication of whether the telescoping leg members are slidably moveable or are locked together, the lock assembly comprising:

at least one lock member associated with and mounted on a respective one of said first and second legs, the lock member being movable between a locked position wherein the lock member exerts a compressive force on the associated leg members to prevent relative movement therebetween and an unlocked position wherein the associated leg members may be slidably adjusted, an outwardly extending lever, the lever being coupled to the lock member for positioning the lock member between the locked and unlocked positions, and said at least one lock member having first and second stop members for limiting the movement of the lever therebetween, the lever being pivotable about an axis which is substantially perpendicular to said leg between the first and second stop members, engagement between the lever and the first stop member positioning the lock member in the looked position and engagement between the lever and the second step member positioning the lock member in the unlocked position, the first and second stop members being disposed no more than 360° apart such that the stop members confine the lever to pivoting no more than 360° to position the lock member in the locked or unlocked position, whereby the relative position of the lever provides a visual indication of whether the lock member is in the locked or unlocked position.

2. The lock assembly of claim 1 further comprising a second lock member, the second lock member being associated with and mounted on the other of said first and second legs.

3. The lock assembly of claim 2 wherein the lever is coupled to said two lock members, whereby pivoting the lever simultaneously positions said two lock members between the locked and unlocked positions.

4. The lock assembly of claim 1 wherein the lock member comprises a clamp member coupled to one of the associated leg members and slidably engaging the other associated leg member, and a lock screw rotatably mounted to the clamp member, rotation of the lock screw selectively biases the associated leg members into stationary engagement with each other, the lever being coupled to the lock screw so that pivoting the lever rotates the lock screw whereby the associated leg members may be selectively locked together to prevent movement therebetween or unlocked to permit slidable adjustment.

5. The lock assembly of claim 3 wherein each lock member comprises a first stop member and a second stop member for limiting the movement of the lever therebetween.

6. The lock assembly of claim 2 wherein the lever comprises two link members, one said link member being pivotally coupled to each lock member, the link members further being pivotally coupled to each other whereby the link members pivot toward or away from each other as the lock members move toward or away from each other.

7. The lock assembly of claim 6 wherein the lever further comprises a housing disposed along a pivotally connected portion of the link members.

8. The lock assembly of claim 7 wherein the lever further comprises a spring, the spring being disposed substantially between the housing and the pivotally connected portion of the link members.

9. The lock assembly of claim 1 wherein the first and second stop members are disposed substantially 180° apart such that the lever may pivot substantially 180°.

10. A tripod comprising a support having at least one pair of adjacent legs, each leg having first and second leg members adapted for axial movement relative to each other, a lock member associated with and mounted on each leg, each lock member having a locked position wherein the lock member prevents relative movement between the associated leg members, and an unlocked position wherein the associated leg members may move axially relative to one another, a lever pivotable about an axis which is substantially perpendicular to said leg, the lever being coupled to the lock member on each adjacent leg and simultaneously positioning both lock members between the locked position and the unlocked position, and at least one said lock member having at least a first stop member and a second stop member for limiting the movement of the lever therebetween, engagement between the lever and the first stop member positioning the lock member in the locked position and the engagement between the lever and the second stop member positioning the lock member in the unlocked position, the first and second stop members being disposed no more than 360° apart such that the stop members confine the lever to pivoting no more than 360° to position the lock member in the locked or unlocked position, whereby the relative position of the lever provides a visual indication of whether the lock member is in the locked or unlocked position.

11. The tripod of claim 10 wherein the lock member comprises a clamp member attached to one of the leg members and slidably engaging the other leg member for clamping the leg members together and a lock screw rotatably mounted to the clamp member for selectively compressing the leg members together, the lever being coupled to the lock screw so that pivoting the lever rotates the lock screw whereby the associated leg members may be selectively locked together to prevent movement therebetween or unlocked to permit relative axial movement therebetween.

12. The tripod of claim 10 wherein the lock member associated with and mounted on each leg comprises first and second stop members.

13. The tripod of claim 10 wherein the lever substantially simultaneously engages the first stop member associated with each lock member to substantially simultaneously position the lock member associated with each leg the locked position, and the lever substantially simultaneously engages the second stop member associated with each lock member to substantially simultaneously position the lock member associated with each leg the unlocked position.

14. The tripod of claim 10 wherein the lock member associated with and mounted on each leg comprises a clamp member coupled to one of the associated leg members and slidably engaging the other associated leg member, and a lock screw rotatably mounted to the clamp member, rotation of the lock screw selectively biases the associated leg members into stationary engagement with each other, the lever being coupled to the lock screw so that pivoting the lever rotates the lock screw whereby the associated leg members may be selectively locked together to prevent movement therebetween or unlocked to permit slidable adjustment.

15. The tripod of claim 10 wherein the first and second stop members are disposed substantially 180° apart such that the handle may pivot substantially 180°.

16. The tripod of claim 10 wherein the lever comprises two link members, one said link member being pivotally coupled to each lock member, the link members further being pivotally coupled to each other whereby the link members pivot toward or away from each other as the lock members move toward or away from each other.

17. The lock assembly of claim 16 wherein the lever further comprises a housing disposed along a pivotally connected portion of the link members.

18. The lock assembly of claim 17 wherein the lever further comprises a spring, the spring being disposed substantially between the housing and the pivotally connected portion of the link members.

\* \* \* \* \*